United States Patent
Yang et al.

(10) Patent No.: US 10,630,433 B2
(45) Date of Patent: Apr. 21, 2020

(54) METHOD FOR TRANSMITTING UPLINK SIGNAL AND APPARATUS THEREFOR

(71) Applicant: LG Electronics Inc., Seoul (KR)

(72) Inventors: Suckchel Yang, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/060,225

(22) PCT Filed: Dec. 12, 2016

(86) PCT No.: PCT/KR2016/014557
§ 371 (c)(1),
(2) Date: Jun. 7, 2018

(87) PCT Pub. No.: WO2017/099556
PCT Pub. Date: Jun. 15, 2017

(65) Prior Publication Data
US 2018/0359057 A1 Dec. 13, 2018

Related U.S. Application Data

(60) Provisional application No. 62/265,994, filed on Dec. 11, 2015.

(51) Int. Cl.
*H04L 1/18* (2006.01)
*H04L 5/00* (2006.01)
(Continued)

(52) U.S. Cl.
CPC .............. *H04L 1/1861* (2013.01); *H04L 1/00* (2013.01); *H04L 1/18* (2013.01); *H04L 1/1812* (2013.01); *H04L 5/00* (2013.01); *H04L 5/0057* (2013.01); *H04W 72/04* (2013.01); *H04W 72/0413* (2013.01)

(58) Field of Classification Search
CPC ....... H04L 1/1812; H04L 5/0057; H04L 1/00; H04L 5/00
See application file for complete search history.

(56) References Cited

U.S. PATENT DOCUMENTS

| | | | |
|---|---|---|---|
| 2013/0195048 A1* | 8/2013 | Ekpenyong | H04W 52/325 370/329 |
| 2015/0245343 A1* | 8/2015 | Wang | H04L 1/1861 370/280 |
| 2015/0327243 A1 | 11/2015 | Yin et al. | |

FOREIGN PATENT DOCUMENTS

WO       2010013963 A2    2/2010

OTHER PUBLICATIONS

Intel Corporation, "Remaining Aspects of PUCCH for MTC", RI-156502, 3GPP TSG RAN WGl Meeting #83, Nov. 7, 2015.*

(Continued)

*Primary Examiner* — Yemane Mesfin
*Assistant Examiner* — Henry Baron
(74) *Attorney, Agent, or Firm* — Dentons US LLP

(57) ABSTRACT

The present invention relates to a wireless communication system. Particularly, the present invention relates to a method and an apparatus therefor, the method comprising the steps of: transmitting a PUSCH on a first RB set of subframe #n; transmitting a PUCCH on a second RB set of subframe #n; and when the first RB set and the second RB set overlap, restricting transmission of the PUCCH on one or more RBs where the first RB set and the second RB set overlap.

8 Claims, 10 Drawing Sheets

(51) Int. Cl.
*H04W 72/04* (2009.01)
*H04L 1/00* (2006.01)

(56) References Cited

OTHER PUBLICATIONS

R1-156502: 3GPP TSG-RAN WG1 Meeting #83, Anaheim, USA, Nov. 15-22, 2015, Intel Corporation, "Remaining aspects of PUCCH for MTC," pp. 1-6.
R1-156951: 3GPP TSG-RAN WG1 Meeting #83, Anaheim, USA, Nov. 15-22, 2015, Panasonic, "PUSCH/PUCCH overlap handling," pp. 1-3.
R1-156645: 3GPP TSG-RAN WG1 Meeting #83, Anaheim, USA, Nov. 15-22, 2015, Nokia Networks, "Handling of PUSCH/PUCCH Overlap," pp. 1-3.
R1-156562: 3GPP TSG RAN WG1 Meeting #83, Anaheim, USA, Nov. 15-22, 2015, CATT, Remaining issues on PUCCH for REL-13 MTC UEs, pp. 1-8.
Huawei, HiSilicon, "Further considerations on non-simultaneous reception and transmission for MTC UEs", 3GPP TSG RAN WG1 Meeting #83, Nov. 15-22, 2015, R1-156450, XP051002910.
International Search Report from PCT/KR2016/014557, dated Mar. 15, 2017.
Writte Opinion of the ISA from PCT/KR2016/014557, dated Mar. 15, 2017.

\* cited by examiner

PUCCH format 1a and 1b structure (normal CP case)

PUCCH format 2,2a and 2b structure (normal CP case)

METHOD FOR TRANSMITTING UPLINK SIGNAL AND APPARATUS THEREFOR

This application is the National Phase of PCT International Application No. PCT/KR2016/014557, filed on Dec. 12, 2016, which claims priority under 35 U.S.C. 119(e) to U.S. Provisional Application No. 62/265,994, filed on Dec. 11, 2015, which is hereby incorporated by reference herein in their entirety.

TECHNICAL FIELD

The present invention relates to a wireless communication system and, more specifically, to a method for transmitting an uplink signal and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

Disclosure of the Invention

Technical Tasks

An object of the present invention is to provide a method of efficiently transmitting an uplink signal in a wireless communication system and an apparatus therefor.

The technical problems solved by the present invention are not limited to the above technical problems and those skilled in the art may understand other technical problems from the following description.

Technical Solution

To achieve these and other advantages and in accordance with the purpose of the present invention, as embodied and broadly described, according to one embodiment, a method of performing uplink transmission by a user equipment (UE) in a wireless communication system, includes the steps of performing a procedure for transmitting a PUSCH (physical uplink shared channel) on a first RB (resource block) set of a subframe #n, performing a procedure for transmitting a PUCCH (physical uplink control channel) on a second RB set of the subframe #n, and if the first RB set is overlapped with the second RB set, setting a limit on transmission of the PUCCH in one or more RBs at which the first RB set and the second RB set are overlapped.

To further achieve these and other advantages and in accordance with the purpose of the present invention, according to a different embodiment, a user equipment (UE) used in a wireless communication system includes an RF (radio frequency) unit and a processor, the processor configured to perform a procedure for transmitting a PUSCH (physical uplink shared channel) on a first RB (resource block) set of a subframe #n, the processor configured to perform a procedure for transmitting a PUCCH (physical uplink control channel) on a second RB set of the subframe #n, the processor, if the first RB set is overlapped with the second RB set, configured to set a limit on transmission of the PUCCH in one or more RBs at which the first RB set and the second RB set are overlapped.

Preferably, transmission of the PUSCH can be normally performed in one or more RBs at which the first RB set and the second RB set are overlapped.

Preferably, transmission of the PUCCH is restricted only in one or more RBs at which the first RB set and the second RB set are overlapped and the PUCCH can be partly transmitted in the remaining RB(s) of the second RB set.

Preferably, UCI (uplink control information) is transmitted via the PUCCH and partial transmission of the PUCCH can reduce a payload size of the UCI scheduled to be transmitted in the subframe #n in proportion to the number of one or more RBs at which the first RB set and the second RB set are overlapped.

Preferably, transmission of the PUCCH can be restricted in all RBs of the second RB set.

Preferably, if transmission of p-CSI (periodic channel state information) is scheduled in the subframe #n, the transmission of the p-CSI can be dropped. If transmission of HARQ-ACK (hybrid ARQ acknowledgement) is scheduled in the subframe #n, the HARQ-ACK can be transmitted via the PUSCH.

Advantageous Effects

According to the present invention, control information can be efficiently transmitted in a wireless communication system. Specifically, uplink control information can be efficiently transmitted and resources for the uplink control information can be efficiently managed in a CA system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Mode for Invention

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
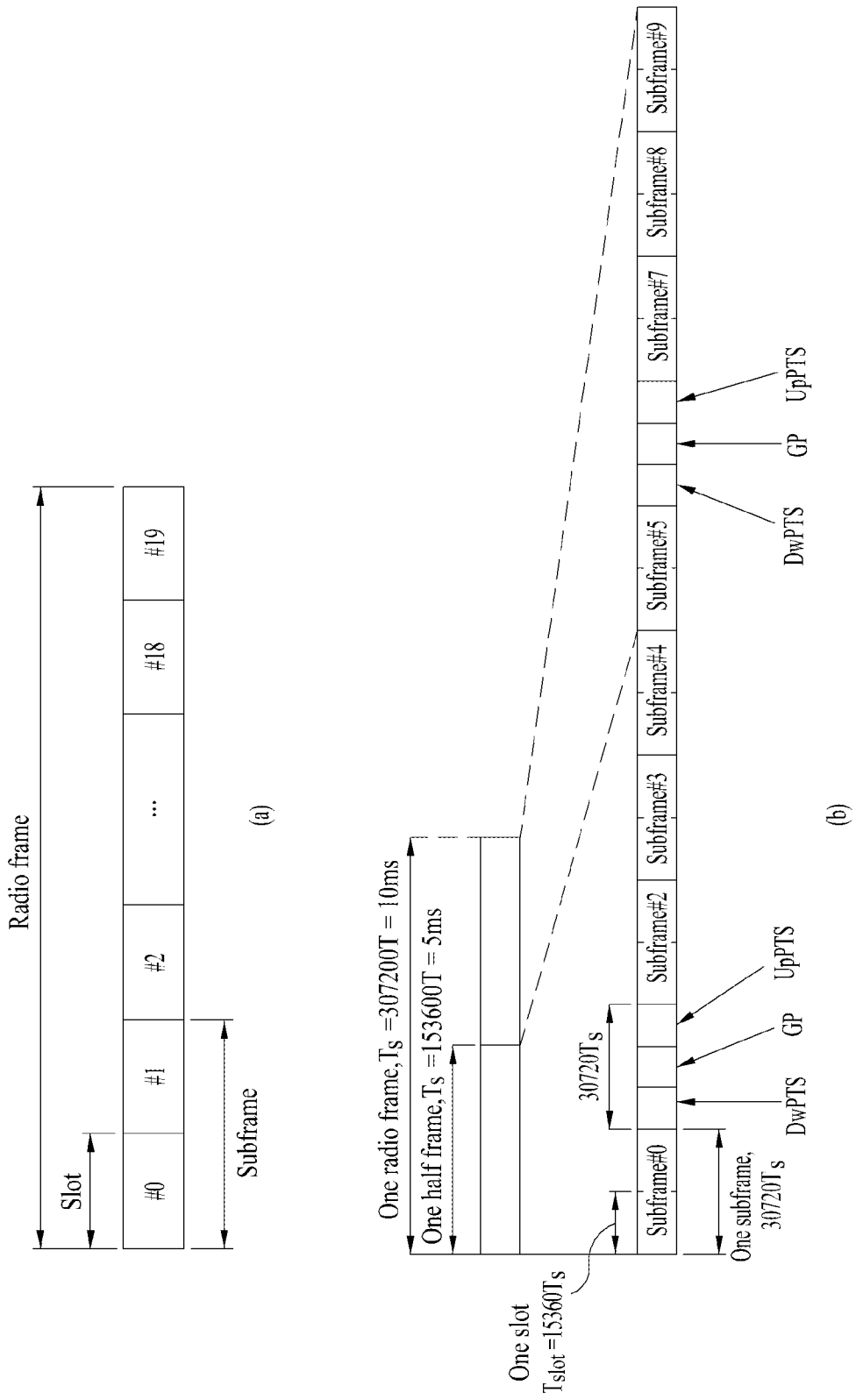
FIG. 1 illustrates a radio frame structure.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (Frequency Division Duplex) and a type-2 radio frame structure applicable to TDD (Time Division Duplex).

FIG. 1(a) illustrates the type-1 radio frame structure. A DL radio frame includes 10 subframes, each subframe including two slots in the time domain. A time required to transmit one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since an LTE(-A) system uses OFDMA for DL, an OFDM symbol indicates one symbol period. The OFDM symbol may be called an SC-FDMA symbol or symbol period. An RB is a resource allocation unit including a plurality of contiguous subcarriers in one slot.

The number of OFDM symbols included in one slot may be changed according to configuration of a cyclic prefix (CP). For example, if each OFDM symbol is configured to include a normal CP, one slot may include 7 OFDM symbols. If each OFDM symbol is configured to include an extended CP, one slot may include 6 OFDM symbols.

FIG. 2(b) illustrates a type-2 radio frame structure. The type-2 radio frame includes 2 half frames. Each half frame includes 5 subframes each of which is composed of 2 slots.

Table 1 shows UL-DL configurations (UL-DL Cfgs) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS according to special subframe configuration. In Table 2, $T_s$ denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

| | | Normal cyclic prefix in downlink | | | Extended cyclic prefix in downlink | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 6 | $19760 \cdot T_s$ | | | $23040 \cdot T_s$ | | |
| 7 | $21952 \cdot T_s$ | | | | | |
| 8 | $24144 \cdot T_s$ | | | | | |

The radio frame structure is merely exemplary and the number of subframes included in the radio frame, the number of slots included in a subframe, and the number of symbols included in a slot can vary.

Figure 2:
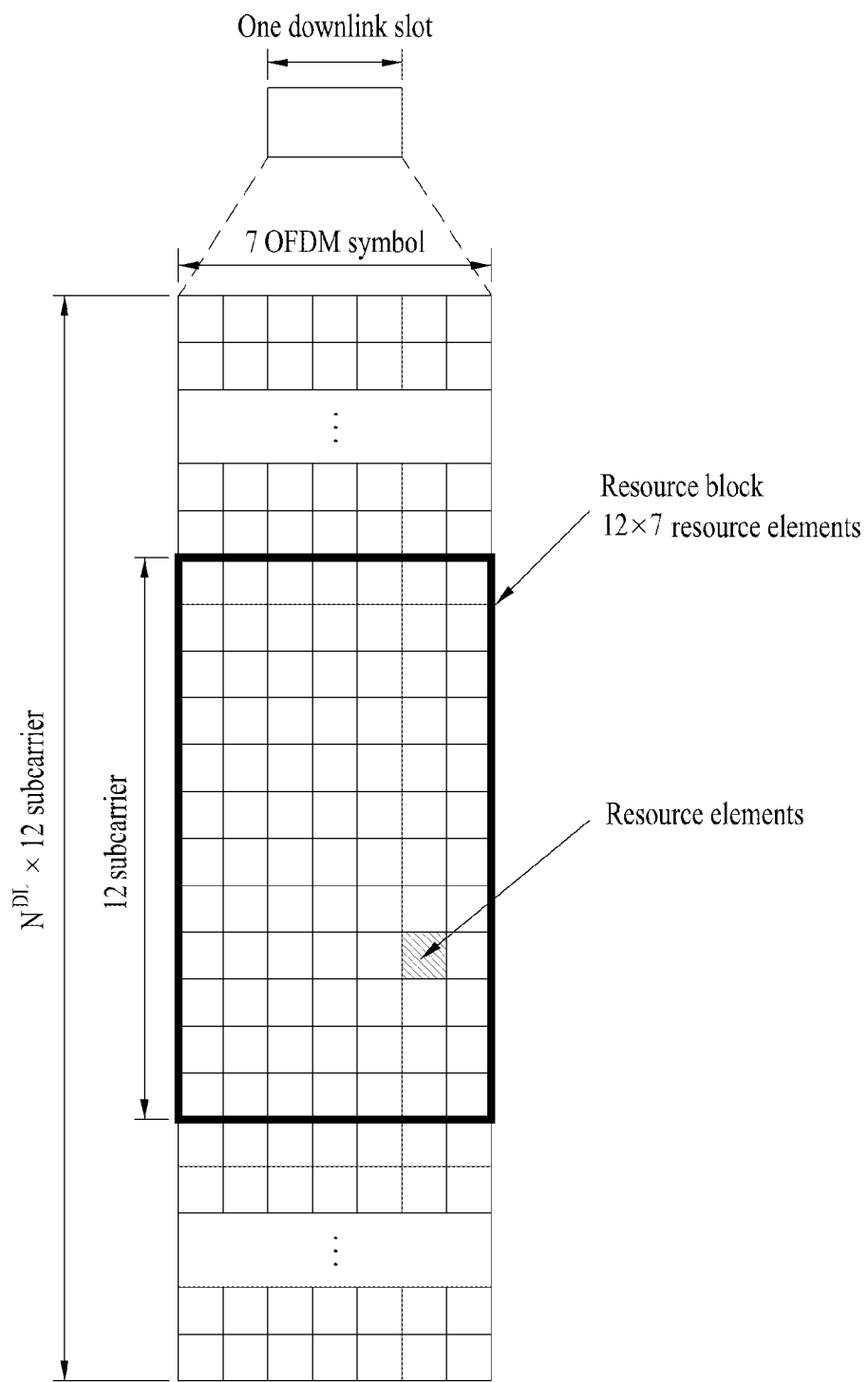
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7 (or 6) REs. The number $N_{RB}$ of RBs depends on a system bandwidth (BW). The structure of an uplink slot may be same as that of the downlink slot except that OFDM symbols by replaced by SC-FDMA symbols.

Figure 3:
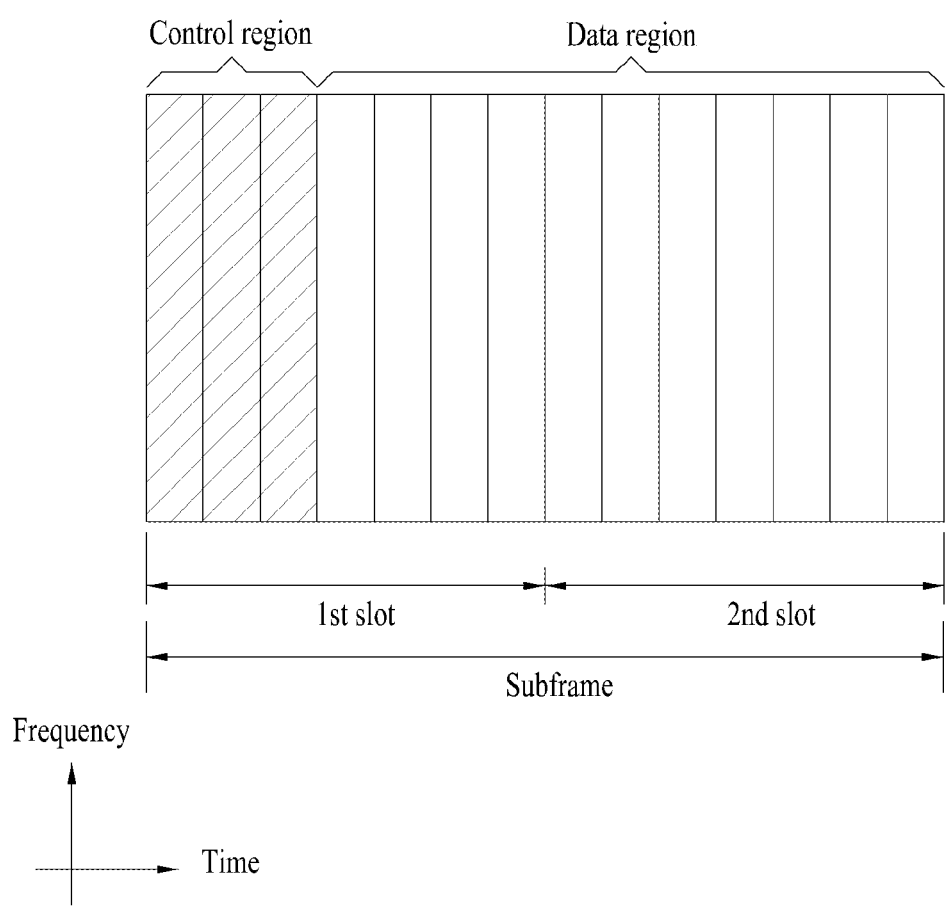
FIG. 3 illustrates a downlink subframe structure.

FIG. 3 illustrates a downlink subframe structure.

Referring to FIG. 3, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift for a DMRS (Demodulation Reference Signal), CQI (Channel Quality Information) request, HARQ process number, TPMI (Transmitted Precoding Matrix Indicator), PMI (Precoding Matrix Indicator) confirmation according as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. A UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. A BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, then an identifier (e.g., cell-RNTI (C-RNTI)) of the UE may be masked to the CRC. Alternatively, when the PDCCH is for a paging message, a paging identifier (e.g., paging-RNTI (P-RNTI)) may be masked to the CRC. When the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
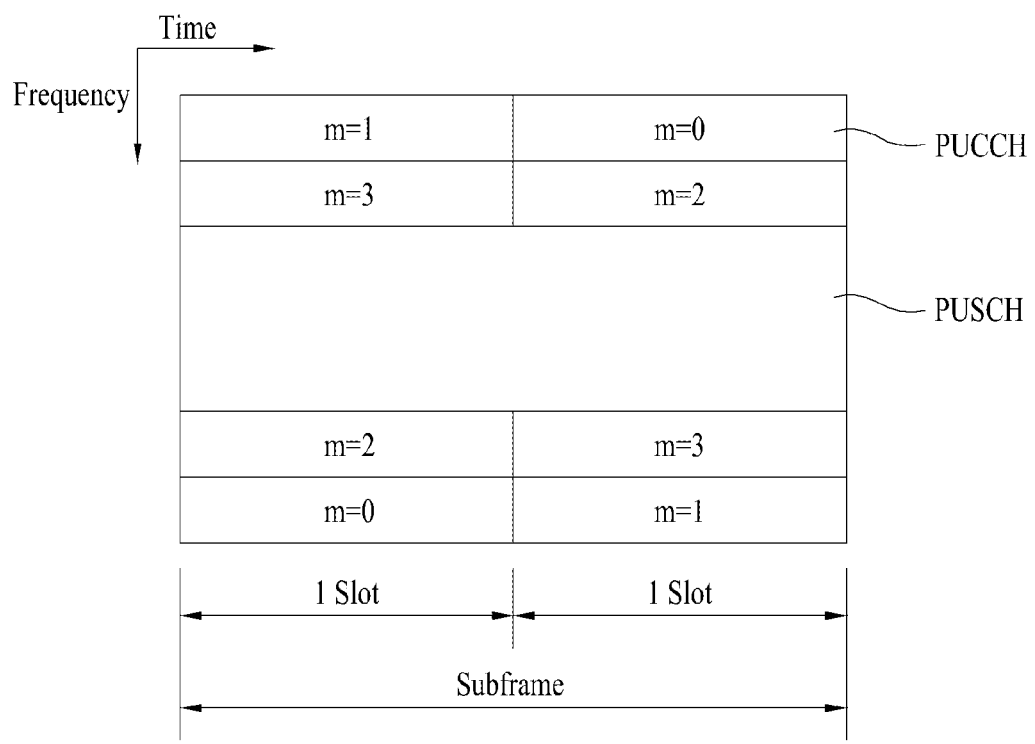
FIG. 4 illustrates an uplink subframe structure.

FIG. 4 illustrates an uplink subframe structure used in LTE.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit A/N signal is transmitted as a response to a single downlink codeword and a 2-bit A/N signal is transmitted as a response to two downlink codewords.

Channel Quality Indicator (CQI): This is feedback information about a downlink channel MIMO (Multiple Input Multiple Output)-related feedback information includes a rank indicator (RI), a precoding matrix indicator (PMI) and a precoding type indicator (PTI). 20 bits per subframe are used.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 5:
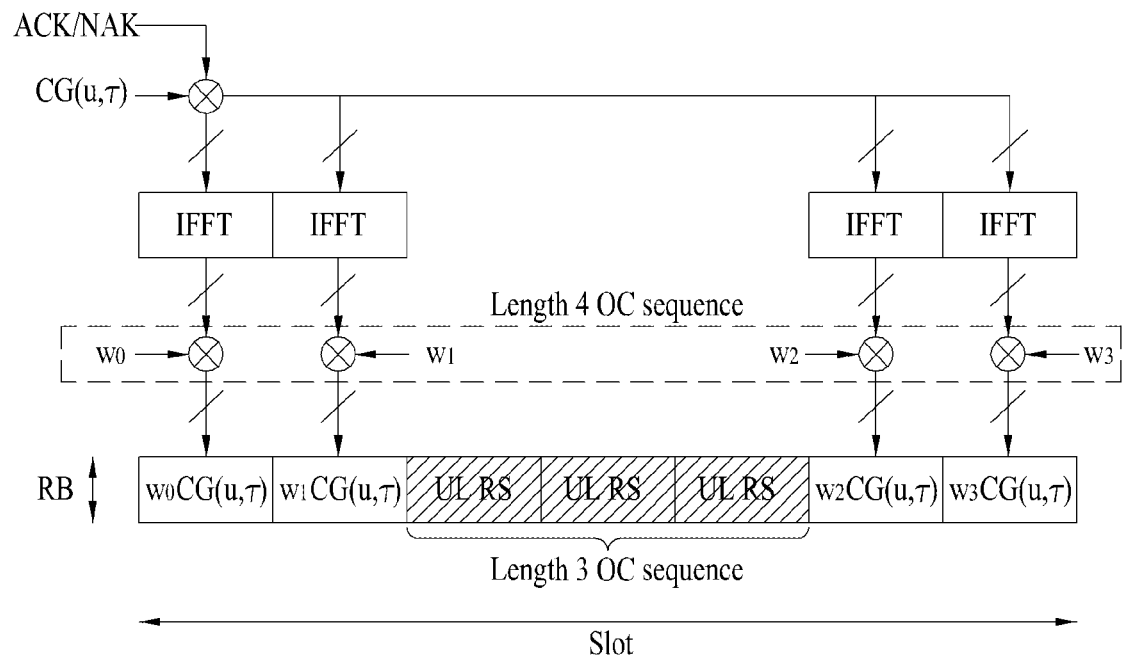
FIG. 5 illustrates a slot level structure of physical uplink control channel (PUCCH) format 1a/1b.

FIG. 5 illustrates a slot level structure of PUCCH format 1a/1b. PUCCH format 1a/1b is used for ACK/NACK transmission. In a normal CP, SC-FDMA #2/#3/#4 is used to transmit a DMRS. In an extended CP, SC-FDMA #2/#3 is used to transmit the DMRS. Therefore, 4 SC-FDMA symbols in a slot are used for ACK/NACK transmission. For convenience, PUCCH format 1a/1b is referred to as PUCCH format 1.

Referring to FIG. 5, 1-bit [b(0)] and 2-bit [b(0)b(1)] A/N information are modulated according to BPSK (binary phase shift keying) and QPSK (quadrature phase shift keying) modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK).

Figure 6:
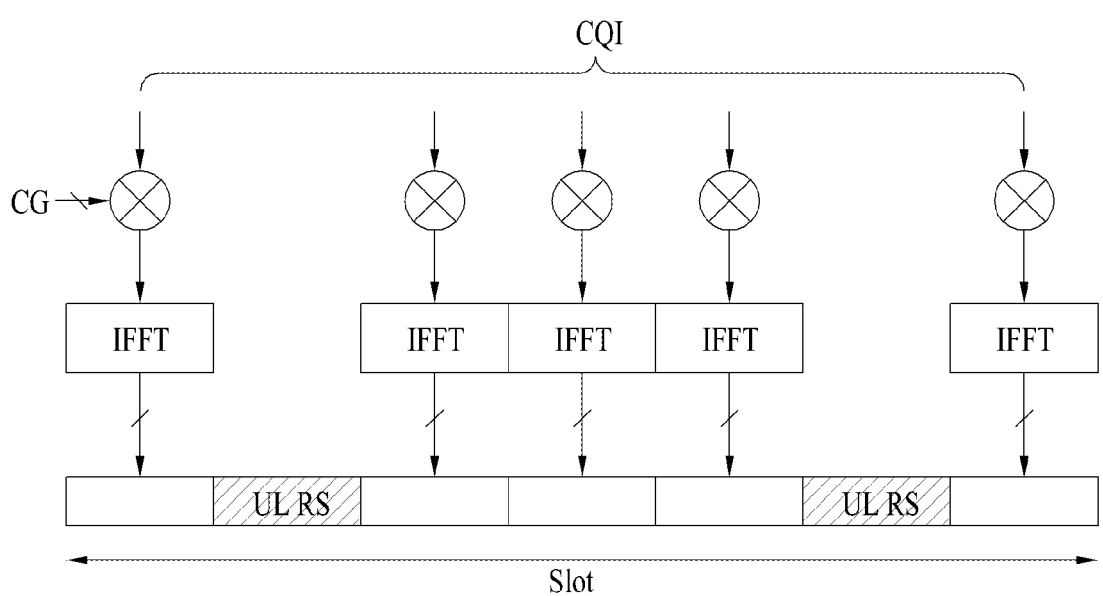
FIG. 6 illustrates a slot level structure of PUCCH format 2/2a/2b.

FIG. 6 illustrates PUCCH format 2/2a/2b. PUCCH format 2/2a/2b is used for CQI transmission. In a normal CP, one subframe includes 10 QPSK data symbols in addition to RS symbols. Each of the QPSK symbols is spread by a CS in the frequency domain and then mapped to a corresponding SC-FDMA symbol. CS hopping of an SC-FDMA symbol level may be applied for randomization of inter-cell interference. An RS may be multiplexed by CDM using a CS. For example, if the number of available CSs is 12 or 6, then 12 or 6 UEs may be multiplexed in the same PRB.

Figure 7:
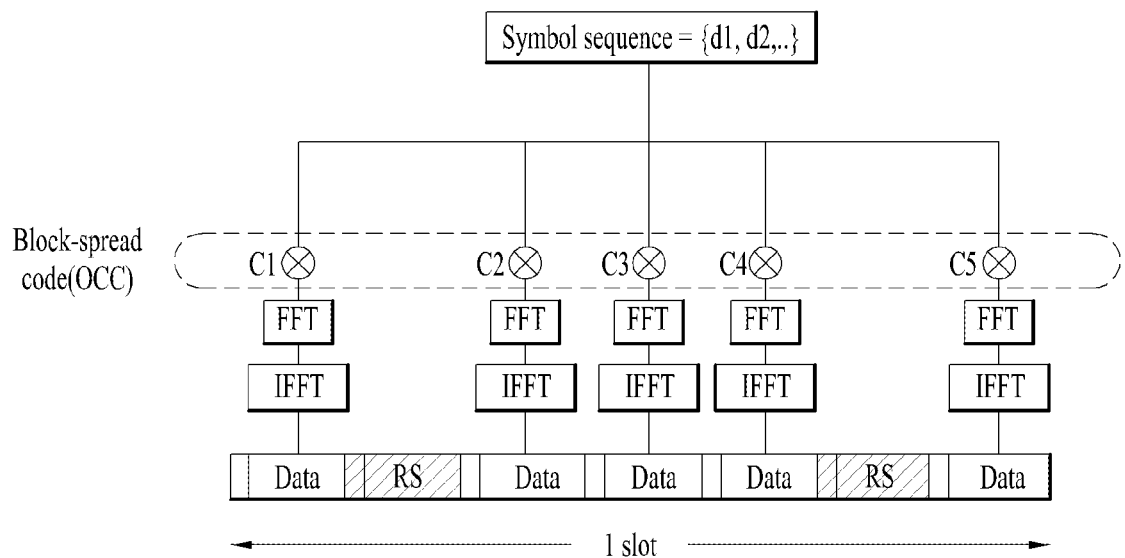
FIG. 7 illustrates a slot level structure of PUCCH format 3.

FIG. 7 illustrates the structure of PUCCH format 3 in a slot level. PUCCH format 3 is used to transmit a plurality of ACK/NACK information, and information such as CSI and/or SR may be transmitted together.

Referring to FIG. 7, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, ... } using a length-5 OCC. Here, the symbol sequence {d1, d2, ... } may be a modulation symbol sequence or a codeword bit sequence. The symbol sequence {d1, d2, ... } may be generated by performing joint coding (e.g., Reed-Muller coding, tail-biting convolutional coding, etc.), block-spreading, and SC-FDMA modulation on a plurality of ACK/NACK information.

Figure 8:
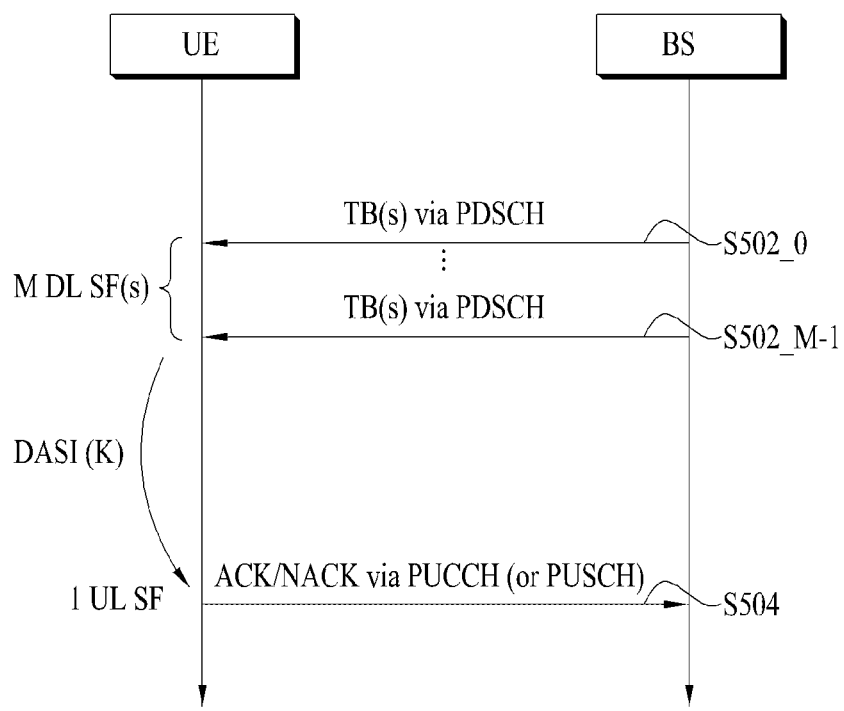
FIG. 8 illustrates a TDD A/N transmission procedure in single cell situation.

FIG. 8 illustrates a TDD UL A/N transmission procedure in single cell situation.

Referring to FIG. 8, a UE can receive one or more DL transmission signals (e.g. PDSCH signals) in M DL subframes (SFs) (S502_0 to S502_M−1). Each PDSCH signal is used to transmit one or more (e.g. 2) transport blocks (TBs) (or codewords) according to transmission mode. A PDCCH signal that requires an ACK/NACK response, for example, a PDCCH signal indicating SPS (Semi-Persistent Scheduling) release (simply, SPS release PDCCH signal) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via a procedure for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M−1. While ACK/NACK is transmitted through a PUCCH basically, ACK/NACK may be transmitted through a PUSCH when the PUSCH is transmitted at an ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK for data received in the M DL subframes is transmitted through one UL subframe (i.e. M DL SF(s): 1 UL SF) and the relationship therebetween is determined by a downlink association set index (DASI).

Table 4 shows DASI (K: {k0, k1, ... , k−1}) defined in LTE(-A). Table 4 shows intervals between a UL subframe transmitting ACK/NACK and a DL subframe associated with the UL subframe from the perspective of the UL subframe. Specifically, when a PDCCH that indicates PDSCH transmission and/or SPS release is present in subframe n−k (where k∈K), the UE transmits ACK/NACK in subframe n.

TABLE 4

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in FDD, ACK/NACK for data received in one DL subframe is transmitted through one UL subframe and k=4. That is, when a PDCCH that indicates PDSCH transmission and/or SPS release is present in subframe n−4, the UE transmits ACK/NACK in subframe n.

In the following, UL channel allocation is explained. The UL channel allocation varies depending on whether or not PUCCH/PUSCH simultaneous transmission is allowed. When the PUCCH/PUSCH simultaneous transmission is not configured, if PUSCH allocation exists in a subframe (e.g., subframe n) in which UCI transmission is required, UCI is transmitted via a PUSCH (PUSCH piggyback). Otherwise, UCI is transmitted via a PUCCH. Yet, if the PUSCH allocation corresponds to a part of a RACH (random access channel) procedure (i.e., if the PUSCH allocation corresponds to a UL grant of RAR), UCI transmission is dropped. On the contrary, if the PUCCH/PUSCH simultaneous transmission is configured, a UE can transmit PUCCH and PUSCH at the same time. Specifically, if PUSCH allocation exists in a subframe (e.g., subframe n) in which UCI transmission is required, HARQ-ACK/SR is transmitted via PUCCH and p-CSI is transmitted via PUSCH. Otherwise, UCI is transmitted via PUCCH.

Figure 9:
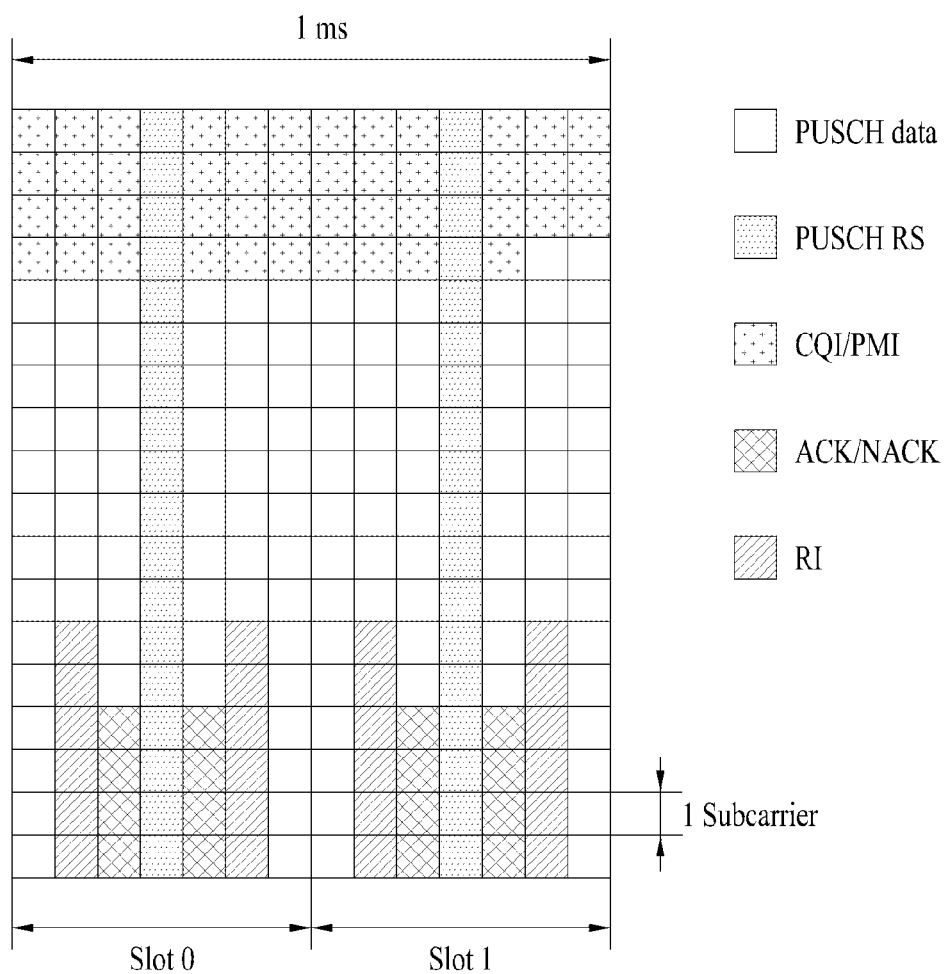
FIG. 9 illustrates a method of transmitting uplink control information via a PUSCH (physical uplink shared channel)

FIG. 9 illustrates a method of transmitting UCI via PUSCH when PUCCH/PUSCH simultaneous transmission is not configured. When PUSCH allocation exists in a subframe in which UCI transmission is required, UCI can be transmitted via PUSCH (PUSCH piggyback). Specifically, in order to piggyback CSI/PMI and RI, rate-matching is performed on PUSCH data (i.e., UL-SCH data) information (e.g., a coded symbol) in consideration of amounts of the CSI/PMI and the RI. Meanwhile, ACK/NACK is inserted into a part of resources of SC-FDMA to which UL-SCH data is mapped via puncturing. And, it is able to schedule UCI (e.g., aperiodic CSI (ap-CSI)) to be transmitted on PUSCH without UL-SCH data.

Figure 10:
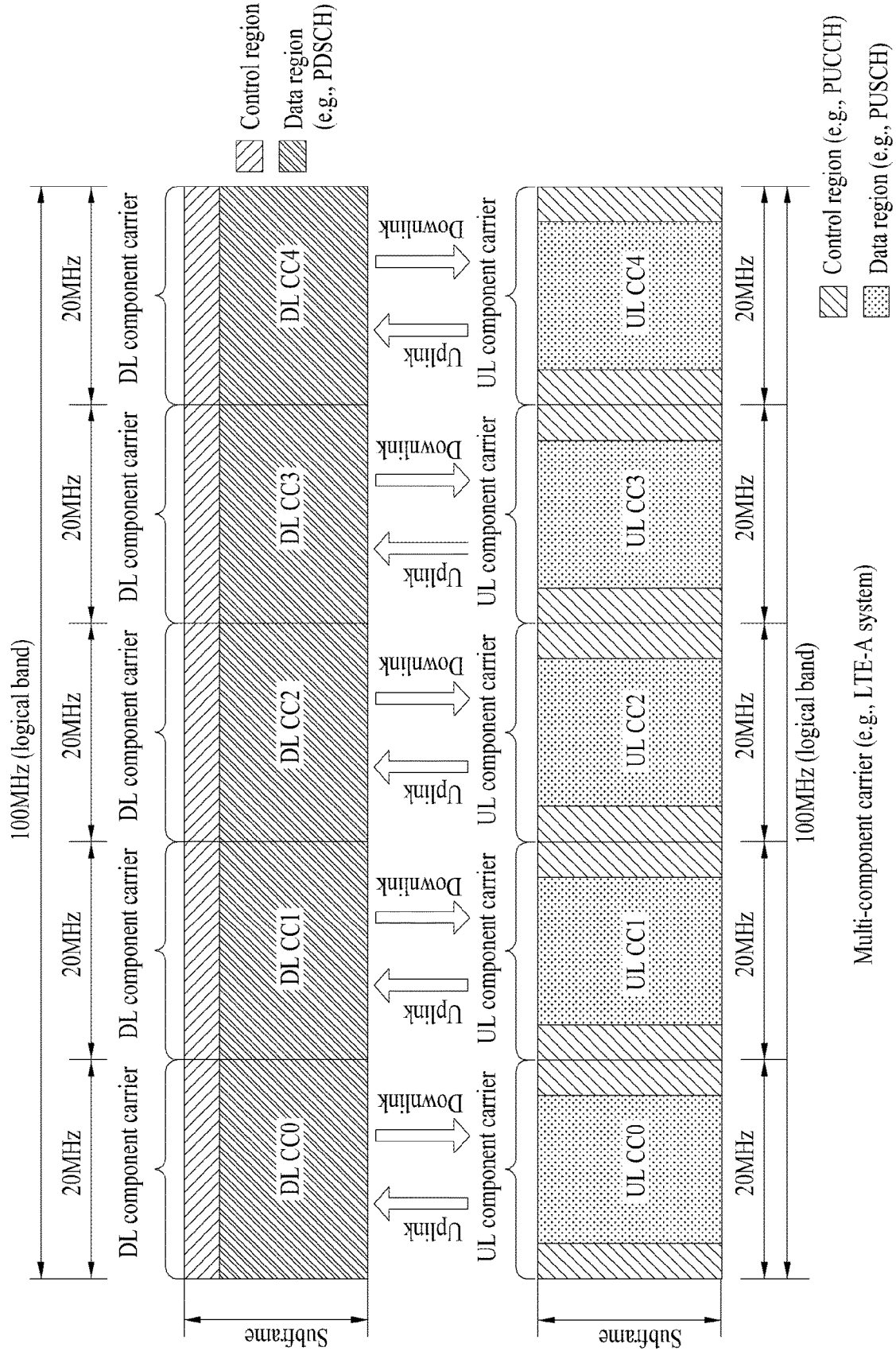
FIG. 10 illustrates a carrier aggregation (CA) communication system.

FIG. 10 illustrates a carrier aggregation (CA) communication system. LTE-A aggregates a plurality of UL/DL frequency blocks to support a wider UL/DL bandwidth in order to use a wider frequency band. Each frequency block is transmitted using a component carrier (CC). The CC may be regarded as a carrier frequency (or center carrier or a center frequency) for the corresponding frequency block.

Referring to FIG. 10, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources [see, 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information when carrier aggregation is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 11:
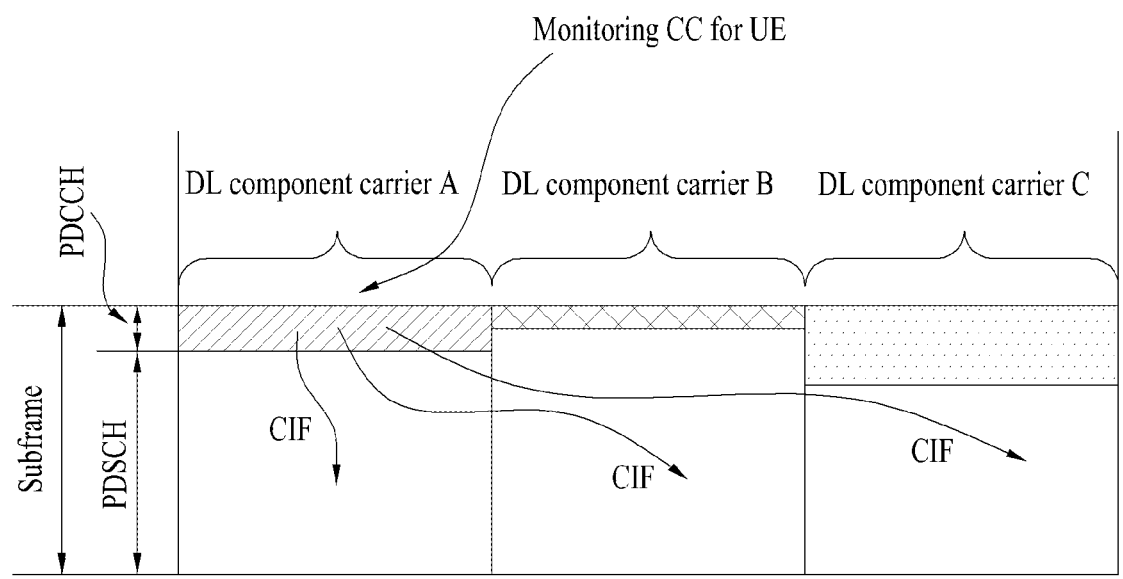
FIG. 11 illustrates scheduling when a plurality of carriers is aggregated.

FIG. 11 illustrates scheduling when a plurality of carriers is aggregated. It is assumed that 3 DL CCs are aggregated and DL CC A is set to a PDCCH monitoring DL CC in FIG. 11. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

Embodiment: Method of Transmitting Signal when UL Channels are Collided

In 3GPP Rel-10/11/12 based LTE-A system, it is able to support CA up to maximum 5 cells/carriers (hereinafter, cells) for a UE. And, a PUCCH, which carries UCI (e.g., HARQ-ACK, p-CSI, etc.) associated with a plurality of cells, is transmitted via a single Pcell only. Meanwhile, a next system (e.g., a system appearing after 3GPP Rel-13) considers aggregating 5 or more cells for a single UE to increase a data transfer rate. In this case, it may consider a new PUCCH format supporting payload of a bigger size compared to a legacy PUCCH format (e.g., PUCCH format 3) in consideration of the increase of a UCI size due to the increase of the number of cells. And, in order to reduce the increase of a UCI transmission frequency/size and PUCCH resource burden in a Pcell due to the increase of the UCI transmission frequency/size, it may consider a method of transmitting PUCCH via a specific Scell (hereinafter, ACell).

In a legacy CA situation, a PUCCH format 3 (hereinafter, PF3)-based method can be configured as a HARQ-ACK (hereinafter, A/N) feedback transmission method. The PF3 can be applied to a CA situation among maximum 5 cells. According to the PF3, A/N (bit) corresponding to each cell is configured as a payload as it is and a coded bit, which is generated via a series of coding (e.g., RM (reed Muller) code) procedures, is mapped/transmitted to a PF3 resource. A maximum UCI code input size capable of being transmitted based on the PF3 is 20 or 21 bits and a UCI code output size corresponding to the maximum UCI code input size is 48 bits. A PF3 resource can be allocated using one of a plurality of PF3 resources which are configured (in advance) via higher layer signaling (e.g., RRC) (irrespective of whether or not cross-CC scheduling is configured). For example, a PF3 resource, which is indicated by ARI of a DL grant for scheduling Scell, can be used for transmitting A/N among a plurality of the PF3 resources configured (in advance) via RRC. The ARI can be included in a TPC (transmit power control) field of PDCCH corresponding to PDSCH of the Scell. PF3 resources different from each other can be distinguished by at least one selected from the group consisting of an RB, an OCC, and a CS. Meanwhile, in a next system, it may consider introducing a new PUCCH format (hereinafter, PF4) that configures CA with the larger number of cells and occupies more UL control resources (e.g., more RBs, OCC of a short length, CS of a big space, etc.) to transmit A/N feedback.

Figure 12:
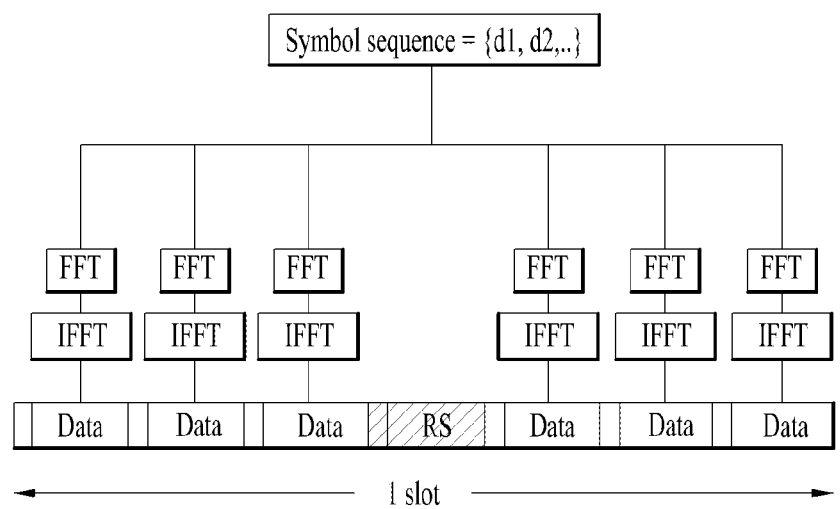
FIG. 12 illustrates a slot level structure of a PUCCH format 4.

FIG. 12 illustrates a slot level structure of PF4. In FIG. 12, PF4 has a PUSCH-similar structure (refer to the data region of FIG. 4). That is, only one RS SC-FDMA symbol is present per slot and the OCC is not applied to the time/symbol domain. Hence, different information is carried on each UCI SC-FDMA symbol (data block in the drawing). For example, a symbol sequence {d1,d2, . . . } may be sequentially carried from the first UCI SC-FDMA symbol to the last UCI SC-FDMA symbol of PF4. The symbol sequence {d1,d2, . . . } may be generated from UCI through (joint) coding (e.g., Reed-Muller coding, tail-biting convolutional coding, etc.). UCI transmitted via the PF4 can include HARQ-ACK, SR (if any), and periodic CSI(s)(p-CSI(s)) (if any). A PF4 resource can be allocated using one of a plurality of PF4 resources which are configured (in advance) via higher layer signaling (e.g., RRC) (irrespective of whether or not cross-CC scheduling is configured). For example, a PF4 resource, which is indicated by ARI of a DL grant for scheduling Scell, can be used for transmitting A/N among a plurality of the PF4 resources configured (in advance) via RRC. The ARI can be included in a TPC field of PDCCH corresponding to PDSCH of the Scell. PF4 resources different from each other can be distinguished by an RB (set).

Meanwhile, when a PUCCH (e.g., PF4) resource is allocated/configured by a plurality of RBs to transmit a great amount of A/N bits and/or (a plurality of) periodic CSI feedbacks, if PUCCH/PUSCH simultaneous transmission is configured (enabled), a PUCCH RB resource and a PUSCH resource allocated/set to a single UE may overlap due to a UL scheduling status, a specific intention of an eNB, or the like. In this case, in order to stably perform UCI signaling and UL data transmission, it is necessary to define a UL transmission operation of a UE.

In the following, when overlap occurs between an RB resource allocated/set to PUCCH transmission and an RB resource allocated/set to PUSCH transmission in a subframe, a method of efficiently transmitting PUCCH/PUSCH is proposed in consideration of UCI signaling and UL data transmission performance. In this case, the PUCCH can be restricted to a PUCCH (e.g., PF4) which is transmitted using one or more RBs.

For clarity, the RB resource allocated/set to the PUCCH transmission is referred to as a PUCCH RB set, a PUCCH RB, or a PUCCH RB resource and the RB resource allocated/set to the PUSCH transmission is referred to as a PUSCH RB set, a PUSCH RB, or a PUSCH RB resource. The PUCCH RB set can be identified using a PUCCH resource (pre)configured via higher layer signaling (refer to PF4 resource). The PUSCH RB set can be identified using RB resource allocation information within a PDCCH (i.e., UL grant DCI) that schedules a PUSCH. And, an overlapped resource between the PUCCH and the PUSCH is referred to as an overlap resource.

First of all, RB overlap cases capable of being occurred between a PUCCH RB resource and a PUSCH RB resource are summarized in the following.

1) Case #1: when the number of RBs of PUCCH is identical to the number of RBs of PUSCH and a PUCCH region is completely overlapped with a PUSCH region 2) Case #2: when the number of RBs of PUCCH is greater than the number of RBs of PUSCH and a PUCCH region completely includes a PUSCH region 3) Case #3: when the number of RBs of PUCCH is less than the number of RBs of PUSCH and a PUCCH region is completely included in a PUSCH region 4) Case #4: when the number of RBs of PUCCH is identical to the number of RBs of PUSCH and a PUCCH region is partly overlapped with a PUSCH region 5) Case #5: when the number of RBs of PUCCH is greater than the number of RBs of PUSCH and a PUCCH region is partly overlapped with a PUSCH region 6) Case #6: when the number of RBs of PUCCH is less than the number of RBs of PUSCH and a PUCCH region is partly overlapped with a PUSCH region Specifically, when PUCCH/PUSCH simultaneous transmission is configured, if overlap occurs between a PUCCH RB resource and a PUSCH RB resource, it may consider a UL transmission (UE operation) method described in the following. Meanwhile, if the PUCCH/PUSCH simultaneous transmission is not configured (disabled), a UE can transmit either PUCCH or PUSCH only in a subframe according to a legacy method irrespective of whether or not a PUCCH RB resource is overlapped with a PUSCH RB resource. And, when the PUCCH/PUSCH simultaneous transmission is configured, if a PUCCH RB resource is not overlapped with a PUSCH RB resource, a UE can transmit PUCCH and PUSCH at the same time in a subframe.

(1) Alt 1: PUCCH Drop (then Transmit PUSCH by Piggybacking PUCCH UCI)

When the PUCCH/PUSCH simultaneous transmission is configured, if a PUCCH RB resource is overlapped with a PUSCH RB resource, a UE omits (drops) PUCCH transmission and performs PUSCH transmission only. When UCI is configured/indicated to be transmitted via PUCCH, (Opt 1) transmission of the UCI can be dropped or (Opt 2) the UCI can be piggybacked using PUSCH. The Opt 2 may be identical to a legacy UL transmission operation when the PUCCH/PUSCH simultaneous transmission is not configured. Meanwhile, it may apply either the Opt 1 or the Opt 2 irrespective of a UCI type. Or, it may apply a different operation according to a UCI type. For example, if UCI corresponds to p-CSI(s), it may apply the Opt 1. If UCI corresponds to A/N, it may apply the Opt 2. If UCI include both the p-CSI(s) and the A/N, it may apply the Opt 1 and the Opt 2 to the p-CSI(s) and the A/N, respectively. Or, it may commonly apply the Opt 2 to the p-CSI(s) and the A/N. Meanwhile, if a PUSCH is transmitted as a part of an RACH (random access response) procedure, in particular, if a PUSCH is transmitted by a UL grant of a RAR (random access response), it may apply the Opt 1 irrespective of a UCI type. In particular, it may be able to apply a different operation according to a UCI type only when a PUSCH is transmitted as a part of a non-RACH procedure (i.e., when a PUSCH is transmitted by a UL grant of a PDCCH). A RAR (UL grant) is received via a PDSCH and a UL grant corresponding to a PUSCH is received via a PDCCH in a non-RACH procedure.

The Alt 1 can be applied to the Cases #1/2/3/4/5/6. The Alt 1 is more appropriate for a case that the number of PUSCH RBs is equal to or greater than the PUCCH RBs (e.g., Cases #1/3/4/6).

(2) Alt 2: PUSCH Drop (then Transmit PUCCH Only)

When the PUCCH/PUSCH simultaneous transmission is configured, if a PUCCH RB resource is overlapped with a PUSCH RB resource, (unlike the Alt 1), a UE omits (drops) PUSCH transmission and performs PUCCH transmission only. In this case, transmission of UCI (PUSCH UCI) (e.g., aperiodic CSI (ap-CSI)), which is determined to be transmitted via a PUSCH (piggyback), is dropped (Opt 1) or the UCI can be transmitted via a PUCCH (Opt 2). The Opt 2 may be identical to a UL transmission operation when there is no PUSCH in a situation that the PUCCH/PUSCH simultaneous transmission is not configured. Meanwhile, it may apply either the Opt 1 or the Opt 2 irrespective of a type of the PUCCH UCI. Or, it may apply a different operation according to the type of the PUCCH UCI. For example, if the PUCCH UCI corresponds to p-CSI(s), the Opt 1 is applied. If the UCI corresponds to A/N, it may apply the Opt 2. If the UCI includes both the p-CSI(s) and the A/N, the Opt 1 and the Opt 2 can be applied to the p-CSI(s) and the A/N, respectively. Or, the Opt 2 can be commonly applied to the p-CSI(s) and the A/N.

The Alt 2 can be applied to the Cases #1/2/3/4/5/6. The Alt 2 is more appropriate for a case that the number of PUCCH RBs is equal to or greater than the PUSCH RBs (e.g., Cases #1/2/4/5).

(3) Alt 3: PUCCH Puncturing (or Rate-Matching) Around PUSCH

When the PUCCH/PUSCH simultaneous transmission is configured, if a PUCCH RB resource is overlapped with a PUSCH RB resource, a PUCCH signal is configured using a remaining resource (partial PUCCH) only except the overlapped resource and a PUSCH signal can be configured using all of originally allocated configured resources (full PUSCH). In order to configure the partial PUCCH, puncturing or rate-matching can be performed on a PUCCH in consideration of the overlapped resource. Meanwhile, a (maximum) UCI payload size on a PUCCH can be reduced in reverse proportion to a size of the overlapped resource (compared to a size when there is no overlapped resource). Hence, a payload size of a UCI, which is scheduled to be transmitted in a corresponding subframe, can be reduced according to the decrease of the (maximum) UCI payload size on the PUCCH. To this end, A/N bundling is performed and a part of p-CSI(s) can be dropped. The A/N bundling can be performed in a manner that A/N is compressed into 1-bit (or 2-bit) through logical AND arithmetic. The p-CSI(S) can be sequentially dropped according to a priority. If the (maximum) UCI payload size on the PUCCH is decreased in consideration of the overlapped resource, it may be able to prevent the increase of a code rate of UCI, thereby securing transmission reliability.

And, it may also be able to configure transmit power of a PUCCH signal to be increased in proportion to a size of an overlapped resource (compared to power when there is no overlapped resource). For example, a positive power offset can be added to transmit power of a PUCCH signal in proportion to a size of an overlapped resource.

The Alt 3 can be applied to the Cases #2/4/5/6. The Alt 3 is more appropriate for a case that the number of PUCCH RBs is equal to or greater than the PUSCH RBs (e.g., Cases #2/4/5).

(4) Alt 4: PUSCH Puncturing (or Rate-Matching) Around PUCCH

When the PUCCH/PUSCH simultaneous transmission is configured, if a PUCCH RB resource is overlapped with a PUSCH RB resource, (unlike the Alt 3), a PUSCH signal is configured using a remaining resource (partial PUSCH) only except the overlapped resource and a PUCCH signal can be configured using all of originally allocated configured resources (full PUCCH). Hence, a UE can transmit the full PUCCH and the partial PUSCH at the same time. In order to configure the partial PUSCH, puncturing or rate-matching can be performed on a PUSCH in consideration of the overlapped resource. Meanwhile, a (maximum) UCI payload size on a PUSCH can be reduced in reverse proportion to a size of the overlapped resource (compared to a size when there is no overlapped resource). To this end, in case of a UCI scheduled to be transmitted on the PUSCH, A/N bundling is performed and a part of (periodic and/or aperiodic) CSI(s) can be dropped. On the contrary, a UL-SCH payload size on the PUSCH can be maintained as it is.

And, it may also be able to configure transmit power of a PUSCH signal to be increased in proportion to a size of an overlapped resource (compared to power when there is no overlapped resource). For example, a positive power offset can be added to transmit power of a PUSCH signal in proportion to a size of an overlapped resource.

The Alt 4 can be applied to the Cases #3/4/5/6. The Alt 4 is more appropriate for a case that the number of PUSCH RBs is equal to or greater than the PUCCH RBs (e.g., Cases #3/4/6).

In case of the Alt 1/2/3/4, it may apply a different method according to a UCI type and a combination. For example, if a PUCCH UCI is configured by p-CSI only, it may apply the Alt1/3. If a PUCCH UCI includes A/N, it may be able to apply the Alt 2/4. As a different method, it may be able to apply a different method according to a PUCCH resource usage (transmission target UCI). For example, if a PUCCH corresponds to a resource configured to transmit p-CSI, it may be able to apply the Alt 1/3. If a PUCCH corresponds to a resource configured to transmit A/N, it may be able to apply the Alt 2/4.

In addition, it may be able to indicate a method among the proposed methods (e.g., Alt 1/2/3/4) and whether to apply a specific method via specific L1 signaling including (E)PD-CCH (e.g., a DL grant for scheduling a PDSCH and/or a UL grant for scheduling a PUSCH). In case of the Alt 1/2, although a resource overlap does not occur between a PUCCH and a PUSCH, it may be able to consider a method of indicating one method to be applied among the two methods or a method of indicating whether to apply a specific method. As a further different method, it may be able to dynamically indicate whether or not PUCCH/PUSCH simultaneous transmission is allowed (enabled/disabled) via specific L1 signaling (e.g., DL/UL grant) (irrespective of whether or not resource overlap occurs between a PUCCH and a PUSCH).

Figure 13:
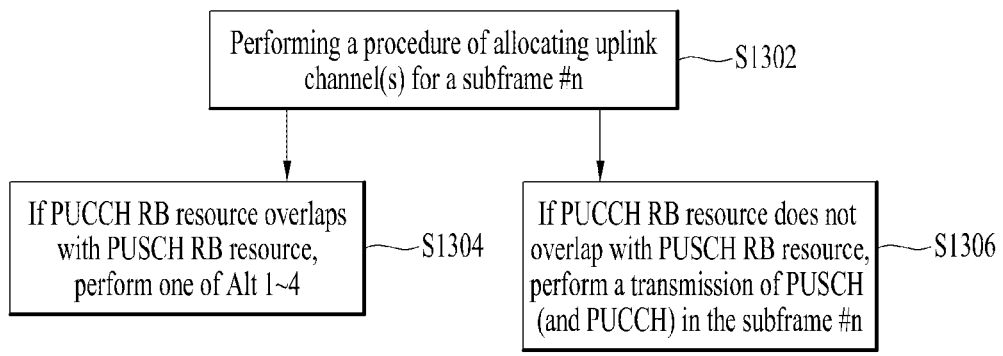
FIG. 13 illustrates a UL transmission procedure according to one embodiment of the present invention.

FIG. 13 illustrates a UL transmission procedure according to one embodiment of the present invention. In FIG. 13, assume that PUCCH/PUSCH simultaneous transmission is configured. Referring to FIG. 13, a UE can perform a procedure for allocating a UL channel(s) to a subframe #n [S1302]. Assume that UCI is scheduled to be transmitted in the subframe #n and PUSCH allocation exists in the subframe #n. In this case, if a PUCCH RB resource is overlapped with a PUSCH RB resource, the UE can perform the methods according to the Alts 1 to 4 proposed in the present invention [S1304]. On the contrary, if a PUCCH RB resource is not overlapped with a PUSCH RB resource, the UE can perform PUSCH (and PUCCH) transmission according to a legacy method in the subframe #n [S1306]. Specifically, HARQ-ACK/SR is transmitted via a PUCCH and p-CSI(s)/ap-CSI is transmitted via a PUSCH.

Meanwhile, if the PUCCH/PUSCH simultaneous transmission is not configured, either the PUCCH or the PUSCH can be transmitted only in the subframe #n according to a legacy operation.

Figure 14:
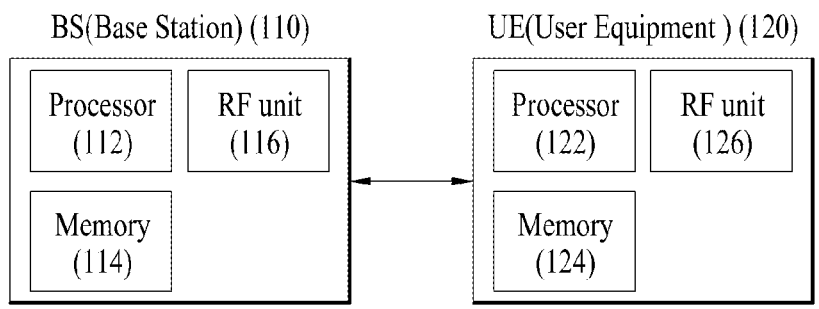
FIG. 14 illustrates a BS and a UE to which embodiments of the present invention are applicable.

FIG. 14 illustrates a BS and a UE to which embodiments of the present invention are applicable. When a wireless communication system includes a relay, the BS or the UE can be replaced by the relay.

Referring to FIG. 14, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for wireless communication apparatuses such as a UE, a relay, a BS, etc.

What is claimed is:

1. A method of performing uplink transmission a user equipment (UE) in a wireless communication system, the method comprising:
   performing a procedure for transmitting a Physical uplink shared channel (PUSCH) on a first resource block (RB) set of a subframe #n;
   performing a procedure for transmitting a physical uplink control channel (PUCCH) on a second RB set of the subframe #n; and
   when the first RB set overlaps the second RB set, setting a limit on transmission of the PUCCH in one or more RBs at which the first RB set and the second RB set overlap, wherein transmission of the PUCCH is restricted only in one or more RBs at which the first RB set and the second RB set overlap, wherein the PUCCH is partly transmitted in the remaining RB(s) of the second RB set, wherein uplink control information (UCI) is transmitted via the PUCCH, and wherein partial transmission of the PUCCH reduces a payload size of the UCI scheduled to be transmitted in the subframe #n in proportion to the number of one or more RBs at which the first RB set and the second RB set are overlapped.

2. The method of claim 1, wherein transmission of the PUSCH is normally performed in one or more RBs at which the first RB set and the second RB set overlap.

3. The method of claim 1, wherein transmission of the PUCCH is restricted in all RBs of the second RB set.

4. The method of claim 3, wherein when transmission of periodic channel state information (p-CSI) is scheduled in the subframe #n, the transmission of the p-CSI is dropped and wherein when transmission of hybrid ARQ acknowledgement (HARQ-ACK) is scheduled in the subframe #n, the HARQ-ACK is transmitted via the PUSCH.

5. A user equipment (UE) used in a wireless communication system, comprising:
a transmitter and a receiver; and
at least one processor,
wherein the at least one processor is configured to:
perform a procedure for transmitting a Physical uplink shared channel (PUSCH) on a first resource block (RB) set of a subframe #n,
perform a procedure for transmitting a physical uplink control channel (PUCCH) on a second RB set of the subframe #n,
when the first RB set overlaps the second RB set, set a limit on transmission of the PUCCH in one or more RBs at which the first RB set and the second RB set overlap,
wherein transmission of the PUCCH is restricted only in one or more RBs at which the first RB set and the second RB set overlap,
wherein the PUCCH is partly transmitted in the remaining RB(s) of the second RB set, and
wherein uplink control information (UCI) is transmitted via the PUCCH, and
wherein partial transmission of the PUCCH reduces a payload size of the UCI scheduled to be transmitted in the subframe #n in proportion to the number of one or more RBs at which the first RB set and the second RB set are overlapped.

6. The UE of claim 5, wherein transmission of the PUSCH is normally performed in one or more RBs at which the first RB set and the second RB set overlap.

7. The UE of claim 5, wherein transmission of the PUCCH is restricted in all RBs of the second RB set.

8. The UE of claim 7, wherein when transmission of periodic channel state information (p-CSI) is scheduled in the subframe #n, the transmission of the p-CSI is dropped and wherein when transmission of hybrid ARQ acknowledgement (HARQ-ACK) is scheduled in the subframe #n, the HARQ-ACK is transmitted via the PUSCH.

* * * * *